(12) United States Patent
Choi et al.

(10) Patent No.: US 11,035,403 B2
(45) Date of Patent: Jun. 15, 2021

(54) RADIAL FORCE SUPPORT APPARATUS

(71) Applicant: HANWHA POWERSYSTEMS CO., LTD, Changwon-si (KR)

(72) Inventors: Jong Won Choi, Changwon-si (KR); Sang Hyeon Park, Changwon-si (KR)

(73) Assignee: HANWHA POWERSYSTEMS CO., LTD, Changwon-si (KR)

( * ) Notice: Subject to any disclaimer, the term of this patent is extended or adjusted under 35 U.S.C. 154(b) by 0 days.

(21) Appl. No.: 16/728,255

(22) Filed: Dec. 27, 2019

(65) Prior Publication Data

US 2020/0332830 A1 Oct. 22, 2020

(30) Foreign Application Priority Data

Apr. 18, 2019 (KR) .................. 10-2019-0045246

(51) Int. Cl.
*F16C 17/24* (2006.01)
*F16C 17/02* (2006.01)
*F16C 33/10* (2006.01)

(52) U.S. Cl.
CPC .......... *F16C 17/024* (2013.01); *F16C 17/243* (2013.01); *F16C 33/101* (2013.01); *F16C 33/1015* (2013.01)

(58) Field of Classification Search
CPC .... F16C 17/024; F16C 17/026; F16C 37/002; F16C 33/1015; F16C 33/101; F16C 33/107; F16C 2360/24; F16C 17/042; F16C 17/243; F16C 33/1005
See application file for complete search history.

(56) References Cited

U.S. PATENT DOCUMENTS

2015/0147010 A1* 5/2015 Komatsubara ........... H02K 7/08
384/107

FOREIGN PATENT DOCUMENTS

| JP | 2004092771 A | * | 3/2004 | ............ F16C 17/024 |
| JP | 2005265010 A | * | 9/2005 | ............ F16C 33/1015 |
| JP | 2012241775 A | * | 12/2012 | ............ F16C 33/101 |
| KR | 10-2003-0029231 A | | 4/2003 | |
| WO | WO2019214883 | * | 11/2019 | |

OTHER PUBLICATIONS

Machine Translation of JP-2004092771-A (Year: 2004).*
Machine Translation of JP-2012241775-A (Year: 2012).*
Machine Translation of JP-2005265010-A (Year: 2005).*
Machine Translation of WO2019214883 (Year: 2019).*

* cited by examiner

*Primary Examiner* — Alan B Waits
(74) *Attorney, Agent, or Firm* — Sughrue Mion, PLLC (57) ABSTRACT

A radial force support apparatus includes: a shaft coupled to an impeller and configured to rotate together with the impeller; and a foil radial bearing supporting the shaft. The foil radial bearing includes a top foil disposed on an inner circumferential surface of the foil radial bearing and facing at least a part of an outer circumferential surface of the shaft, and the shaft facing the top foil includes at least one groove provided on the outer circumferential surface of the shaft.

4 Claims, 7 Drawing Sheets

RADIAL FORCE SUPPORT APPARATUS

CROSS-REFERENCE TO THE RELATED APPLICATION

This application claims priority from Korean Patent Application No. 10-2019-0045246 filed on Apr. 18, 2019 in the Korean Intellectual Property Office, the disclosure of which is incorporated herein by reference in its entirety.

BACKGROUND

1. Field of the Disclosure

Apparatuses consistent with exemplary embodiments relate to a radial force support apparatus for improving the effect of cooling down a shaft that rotates together with an impeller at a high speed, and more particularly, to a radial force support apparatus including a flow path for a cooling gas formed on an outer circumferential surface of a shaft for cooling the shaft.

2. Description of the Related Art

A bearing is a device that supports the load of a shaft in a turbo apparatus including a rotor, such as a compressor, a pump and a turbine. A bearing guides, with minimal friction with a shaft, rotation of the rotor. Particularly, a bearing for supporting the radial force of the shaft is referred to as a radial bearing.

A radial bearing is formed in an annular shape around the outer diameter of a shaft, and the shaft is installed such that the shaft penetrates through the center of the radial bearing. Therefore, the radial bearing fixes the position of the shaft and supports the load that is transmitted when the shaft moves in the radial direction while rotating at a high speed.

A gas foil radial bearing (hereinafter referred to as a foil radial bearing) is a type of bearing which supports the load of a shaft by forming a high-pressure gas (e.g., air) film between the bearing and the shaft, instead of an oil film.

Figure 1:
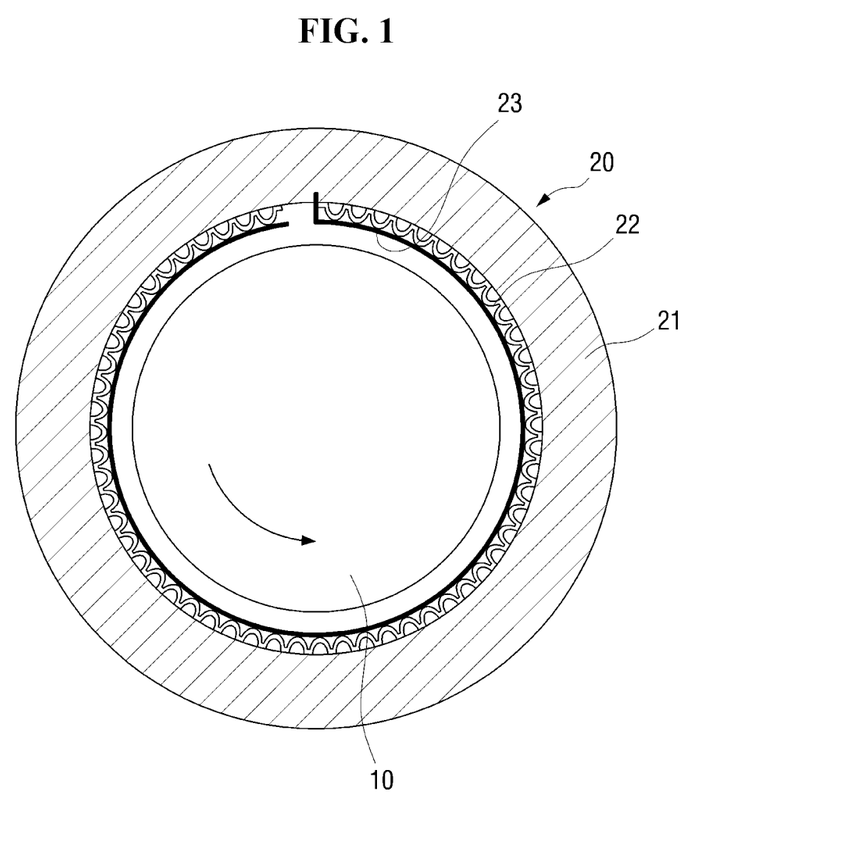
FIGS. 1 and 2 are cross-sectional views showing foil radial bearings mounted on a shaft in the related art.
Figure 2:
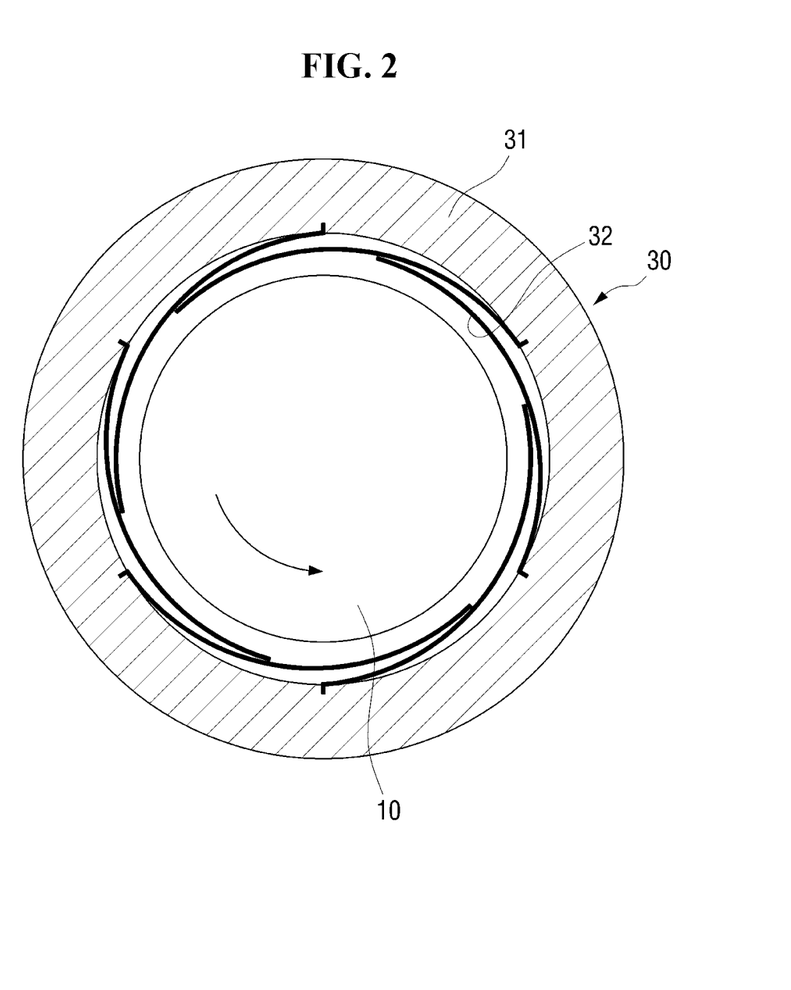

FIGS. 1 and 2 are cross-sectional views showing foil radial bearings mounted on a shaft according to the related art.

Referring to FIGS. 1 and 2, disclosed is a bump-type foil bearing 20 (FIG. 1) including a top foil 23 forming a high-pressure gas film between a shaft 10 and the bump-type foil bearing 20, and a bump foil 22 supporting the top foil 23 from the bottom (i.e., from an outer radial side). A leaf-type foil bearing 30 (FIG. 2) also includes a plurality of top foils 32 forming an air film between a shaft 10 and the leaf-type foil bearing 30, and portions of the top foils 32 overlap with one another. A leaf spring for supporting the top foils 32 may be disposed under the top foils 32 of the leaf-type foil bearing 30.

The bump-type foil radial bearing 20 and the leaf-type foil radial bearing 30 both include top foils 23 and 32, respectively, which face the respective shafts 10 and form a high-pressure air film between the shaft 10 and the bump-type foil radial bearing 20 and the leaf-type foil radial bearing 30, respectively. These high-pressure air film (i.e., the top foils 23 and 32) supports a radial force transmitted from the shaft 10. The foil radial bearings 20 and 30 supporting the load using the high-pressure air film exhibit better load supporting effect than ball bearings supporting the load using an oil film. Therefore, the foil radial bearings are commonly used in turbo machines rotating at high speed.

Here, the shaft 10 rotating at a high speed is likely to overheat. When the temperature of the shaft 10 rises, the bearing disposed adjacent to the shaft 10 may be damaged due to, for example, thermal stress. As a result, serious problems may arise, preventing the normal operation of the turbo apparatus.

Accordingly, in order to cool down the rotating shaft 10 operating with bearings, existing turbo apparatuses additionally have a device for injecting a cooling gas. Unfortunately, such an additional device increases the cost as well as increase the size and the weight of the turbo apparatuses.

In order to mitigate this problem, in an existing turbo apparatus, a through hole is formed in housings 21 and 31 of the bearing to introduce the cooling gas into the housing. However, there is a problem that the cooling efficiency is low because the cooling gas cannot reach the shaft 10, which is a heating element (see Korean Patent Laid-Open Publication No. 10-2003-0029231).

SUMMARY

One or more exemplary embodiments of the disclosure provide a radial force support apparatus that can prevent a shaft from overheating without any additional cooling device provided within a turbo apparatus.

It should be noted that objects of the present disclosure are not limited to the above-mentioned object; and other objects of the present invention will be apparent to those skilled in the art from the following descriptions.

According to an aspect of an exemplary embodiment, there is provided a radial force support apparatus including: a shaft coupled to an impeller and configured to rotate together with the impeller; and a foil radial bearing supporting the shaft. The foil radial bearing includes a top foil disposed on an inner circumferential surface of the foil radial bearing and facing at least a part of an outer circumferential surface of the shaft, and the shaft facing the top foil includes at least one groove provided on the outer circumferential surface of the shaft.

The at least one groove may be formed in a curved line with respect to an axial direction of the shaft.

The at least one groove formed in the curved line may have a shape that spirals on the outer circumferential surface of the shaft in a direction opposite to a rotation direction of the shaft.

The at least one groove may be formed in a straight line.

The at least one groove formed in the straight line may be inclined with respect to an axial direction of the shaft in a direction opposite to a rotation direction of the shaft.

A cross-section of the at least one groove may have a semicircular shape, a quadrangular shape or a triangular shape.

The at least one groove may include an opening formed at each of opposite ends of the at least one groove, and each opening does not overlap with the top foil.

According to an aspect of another exemplary embodiment, there is provided a radial force support apparatus including: a shaft coupled to an impeller and configured to rotate together with the impeller; and a foil radial bearing supporting the shaft and including a top foil disposed on an inner circumferential surface of the foil radial bearing and facing an outer circumferential surface of the shaft. The shaft includes a plurality of grooves provided on the outer circumferential surface of the shaft, each of the plurality of grooves extending in a direction opposite to a rotation direction of the shaft.

Each of the plurality of grooves may be formed in a curved line with respect to an axial direction of the shaft.

Each of the plurality of grooves may extend in a straight line.

Each of the plurality of grooves extending in the straight line may be inclined with respect to an axial direction of the shaft.

According to exemplary embodiments, at least following effects can be achieved:

It is possible to effectively cool down a portion of shaft where a bearing is mounted even without any additional cooling device.

BRIEF DESCRIPTION OF THE DRAWINGS

The above and/or other aspects and features of the present disclosure will become more apparent by describing in detail exemplary embodiments thereof with reference to the attached drawings, in which.

DETAILED DESCRIPTION

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various different ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 3:
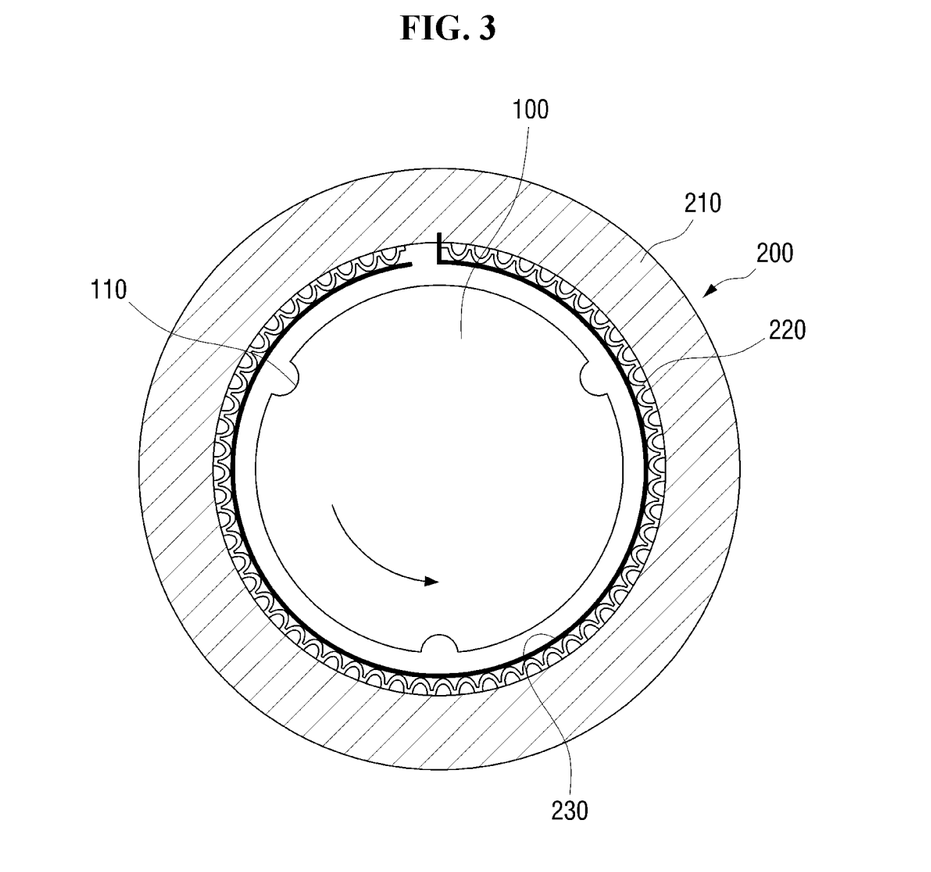
FIG. 3 is a cross-sectional view of a radial load support apparatus according to an exemplary embodiment.
Figure 4:
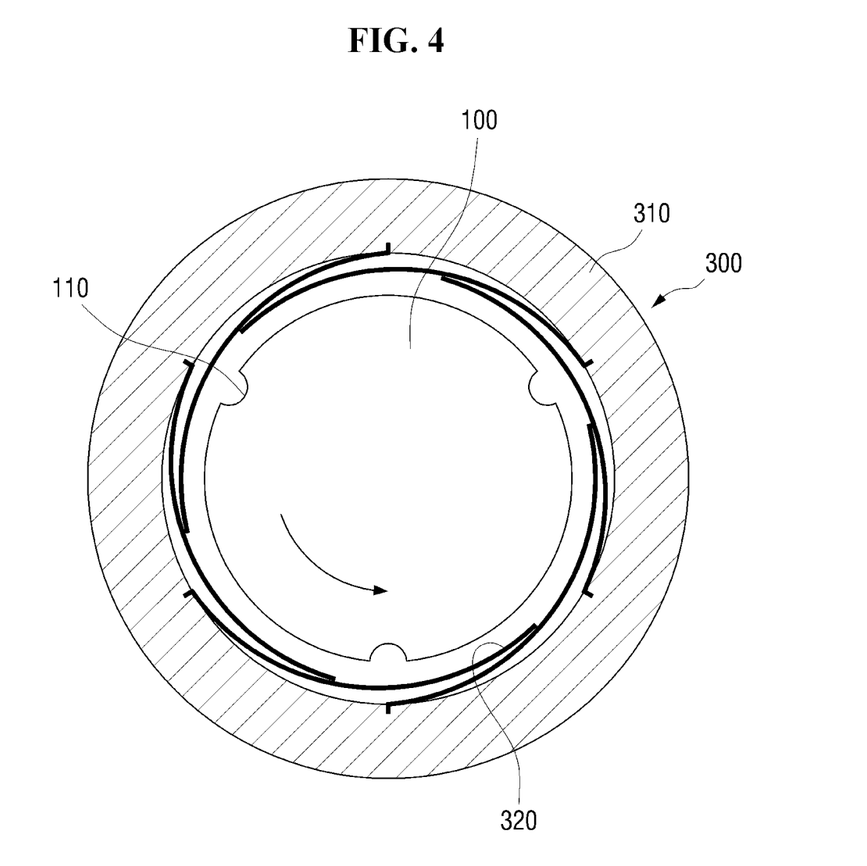
FIG. 4 is a cross-sectional view of a radial load support apparatus according to another exemplary embodiment.

FIG. 3 is a cross-sectional view of a radial force support apparatus according to an exemplary embodiment. FIG. 4 is a cross-sectional view of a radial force support apparatus according to another exemplary embodiment.

Referring to FIGS. 3 and 4, a radial force support apparatus according to an exemplary embodiment may include: a shaft 100 coupled to a an impeller 400 and configured to rotate together with the impeller 400; and a foil radial bearing 200 supporting a radial load of the shaft 100. The foil radial bearing may include a top foil 230 that faces at least a part of an outer circumferential surface of the shaft. At least one groove may be formed on the outer circumferential surface of the shaft 100 facing the top foil 230 to allow a cooling gas to flow along the groove.

The impeller 400 (FIG. 5) rotates at a high speed to draw in a gas from the exterior of the turbo apparatus, and compresses the gas into a low-velocity, high-pressure gas. The shaft 100 is coupled to the impeller 400 to rotate together with the impeller 400, and transmits the power from a motor (or a driver) to the impeller 400.

A radial bearing is employed to support the radial force of the shaft 100 rotating at a high speed and fix the position of the shaft 100. In the following description, a force in the radial direction of the shaft 100 is referred to as a radial force. The radial bearing for supporting the radial force is disposed in a shape that annularly surrounds a part of the outer circumferential surface of the shaft 100 along the outer diameter of the shaft 100.

The radial force support apparatus according to the exemplary embodiment may include foil radial bearings 200; 300. The foil radial bearing supports a load transmitted to the bearing by forming an air film between the rotating shaft 100 and the bearing, instead of an oil film. Typically, the foil radial bearings are classified into bump-type bearings and leaf-type bearings.

In the bump-type foil bearing 200 (FIG. 3), the top foil 230 forming a gas film of high pressure is disposed between the shaft 100 and the bump-type foil bearing 200 such that the top foil 230 faces the outer circumferential surface of the shaft 100. A bump foil 220 in the form of a corrugated cardboard is disposed under the top foil 230. The bump foil 220 supports the top foil 230 when the top foil 230 is compressed as the shaft 100 moves in the radial direction while rotating. The shaft 100 generates heat as the shaft 100 rotates at a high speed. If the temperature of the shaft 100 rises above a certain reference level, the bearing 100 installed adjacent to the shaft 100 may be damaged. Once the bearing is damaged, the damaged bearing may cause a failure of the turbo apparatus (or a compressor). To prevent this, it is necessary to cool down the heat-generating portion of the shaft 100.

The air film (or the gas film) formed between the top foil 230 and the shaft 100 can cool down the shaft 100, in addition to supporting the load of the shaft 100. Therefore, the thicker the gas film is, the better the cooling effect becomes. However, if the thickness of the gas film is greater than a predetermined level, the gas film cannot have a sufficient pressure, and accordingly the radial bearing may fail to sufficiently support the radial force generated by the shaft 100. Therefore, in order to allow the radial bearing to support the radial force of the shaft 100, the distance between the top foil 230 and the shaft 100 has to be maintained within a predetermined range.

The flowing gas in contact with the shaft 100, a heating element, i.e., the gas flowing between the top foil 230 and the shaft 100 has a high cooling efficiency, but there is a limitation in the volume. This is because the gas film has to be thin in order to have a pressure high enough to support the shaft 100, as described above. On the other hand, a relatively large volume of the gas can flow between the bump foils 220, but this gas is separated from the shaft 100 such that the gas flowing between the bump foils 220 is not efficient to cool down the shaft. For this reason, it would be a more direct solution to prevent the shaft 100 from overheating by way of increasing the volume of the cooling gas flowing between the shaft 100 and the top foil 230.

To this end, according to an aspect of an exemplary embodiment, at least one groove 110 may be formed on the outer circumferential surface of the shaft 100, in order to increase the volume of the cooling gas flowing between the shaft 100 and the top foil 230 while maintaining the distance between the shaft 100 and the top foil 230. In addition, incorporating the at least one groove on the outer circumferential surface of the shaft 100 would also increase the overall surface area of the outer circumferential surface of the shaft 100. The groove at least one 110 may be formed on the outer circumferential surface of the shaft 100 such that it may overlap with the top foil 230 of the foil radial bearing 200. By forming the at least one groove 110 on the outer circumferential surface of the shaft 100 where the at least one groove 110 works as a path of the cooling gas, it is possible to mitigate a portion of the shaft 100 on which the radial bearing is disposed from overheating even without any additional cooling device.

In the leaf-type foil bearing 300, a number of top foils 320 is disposed such that the top foils 320 face the outer circumferential surface of the shaft 100, and portions of the top foils 320 overlap with one another as shown in FIG. 4. The leaf-type foil bearing 300 also forms a high pressure gas film between the top foils 320 and the shaft 100, like the bump-type foil bearing 200 described above. When the gas film rotates as the shaft 100 rotates, the gas film supports the load transmitted to the bearing. To support the top foils 320 when the top foils 320 are compressed, a leaf spring is disposed between the top foils 320 and a housing 310 of the bearing.

Also in the leaf-type foil bearing, although a large volume of gas may flow between the top foils 320 overlapping with one another, the gas is separated from the shaft 100 and thus the gas is not effective to cool down the shaft due to the distance between the gas flowing between the top foils 320 and the shaft 100. On the other hand, the gas flowing between the top foils 320 and the shaft 100 may make direct contact with the shaft 100 and thus it is efficient to cool down the shaft with the gas flowing between the top foils 320 and the shaft 100. However, only a small volume of gas can flow in order to have a pressure high enough to support the load. Therefore, also in the leaf-type foil bearing, it is necessary to increase the volume of the gas flowing between the top foils 320 and the shaft 100, which has a better cooling effect, as in the bump-type foil bearing. Thus, the foil radial bearings 200; 300 of the radial force support apparatus according to an exemplary embodiment may be applied to both bump-type and leaf-type foil radial bearings. Although the foil radial bearing 200 of the bump type will be described as an example for convenience of illustration, it is to be understood that the technical idea of the present disclosure can be equally applied a leaf-type bearing 300.

Hereinafter, the shape of the at least one groove 110 formed in the shaft 100 will be described in more detail.

Figure 5:
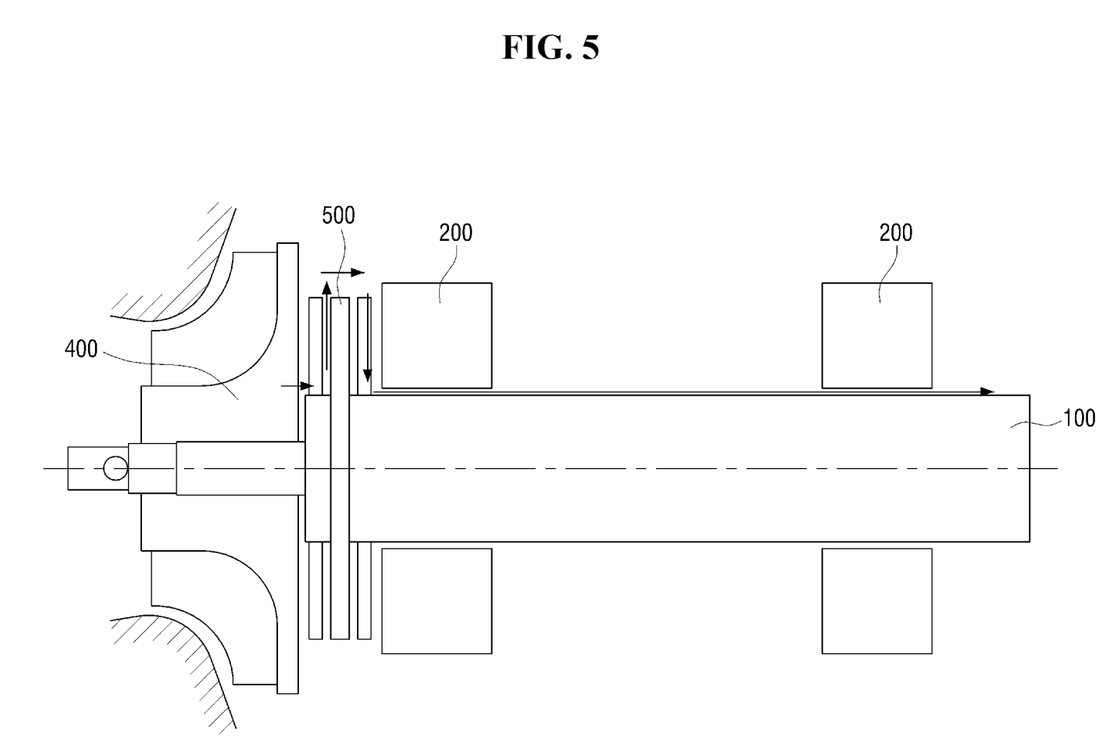
FIG. 5 is a view showing a direction in which a cooling gas flows in a radial load support apparatus according to an exemplary embodiment.
Figure 6:
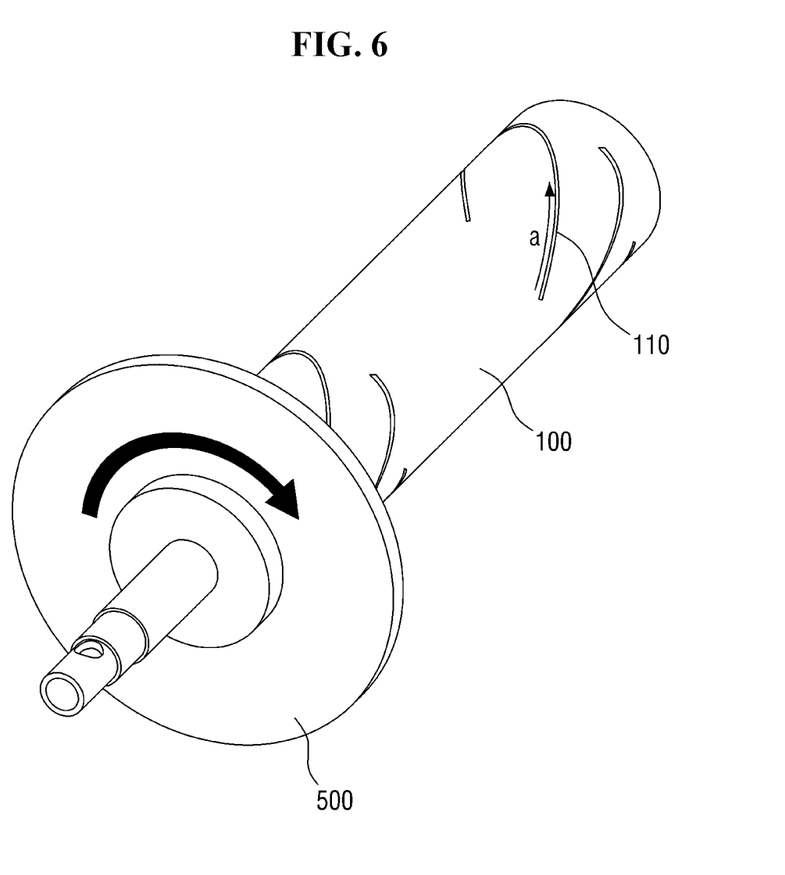
FIG. 6 is a perspective view of a radial load support apparatus according to an exemplary embodiment when viewed from the front.

FIG. 5 is a view showing a direction in which a cooling gas flows in a radial force support apparatus according to an exemplary embodiment. FIG. 6 is a perspective view of a radial force support apparatus according to an exemplary embodiment when viewed from the front.

Referring to FIG. 5, the high-pressure gas flowing out of the impeller 400 moves backward along the shaft 100 by the air pressure difference. For clarity of the description, the end of the shaft 100 that is coupled to the impeller 400 is referred to as the front end, while the opposite end of the front end of the shaft 100 is referred to as the rear end. The direction from the front end to the rear end of the shaft 100 is referred to as the backward direction, while the direction from the rear end to the front end of the shaft 100 is referred to as the forward direction.

Specifically, the gas introduced from the rear face of the impeller 400 moves in the backward direction along the shaft 100 to meet a thrust runner 500. Then, the gas moves toward the outer diameter of the thrust runner 500 in a radial direction from the inner diameter of the thrust runner 500. Then, the gas moves along the outer circumferential surface of the thrust runner 500 in the backward direction and moves back in the radial direction toward the inner diameter of the thrust runner 500. Then, the gas moves in the backward direction along the shaft 100.

Thrust bearings for supporting the axial force of the shaft 100 are disposed on the front and rear sides of the thrust runner 500, respectively, facing the thrust runner 500 described above. The foil radial bearing 200 for supporting the radial force of the shaft 100 is disposed on the rear side of the thrust runner 500 and the thrust bearings. It can be seen from FIG. 5 that the cooling gas flowing between the top foil 230 of the foil radial bearing 200 and the shaft 100 moves toward the rear end from the front end of the shaft 100.

The at least one groove 110 formed on the outer circumferential surface of the shaft 100 according to the exemplary embodiment may have a shape that reduces the flow resistance of the gas taking into account the moving direction of the cooling gas and the rotating direction of the shaft 100.

According to the exemplary embodiment shown in FIG. 6, the at least one groove 110 may be formed on the outer circumferential surface of the shaft 100 as curved lines. In order to reduce the gas flow resistance moving along the groove 110, the groove 110 may be curved in the direction opposite to the rotational direction of the shaft 100 when viewed in the direction toward the shaft 100 from the impeller 400.

From the front view of the shaft 100, the at least one groove 110 formed on the outer circumferential surface of the shaft 100 may be curved in a counterclockwise direction when the shaft 100 rotates in a clockwise direction. The gas from the rear face of the impeller 400 may flow from the front end to the rear end of the shaft 100 along the outer circumferential surface of the shaft 100 as described above. When the gas flows from the front end to the rear end of the shaft 100 in a straight line parallel to the central axis of the shaft 100, if the shaft 100 rotates in the clockwise direction, the movement of the cooling gas drawn on the outer circumferential surface of the shaft 100 would be a curved shape (a) curving in the counterclockwise direction. Therefore, by forming the groove 110 curved counterclockwise on the outer circumferential surface of the shaft 100, it is possible to reduce the flow resistance of the gas moving inside the groove 110. If the shape of the groove 110 is formed as a clockwise curved line, i.e., in the same direction as the rotation direction of the shaft 100, the flow resistance of the gas increases and thus the flow rate of the gas flowing in the groove 110 per unit time may be reduced. This may result in a decrease in the efficiency of cooling the shaft 100.

According to another exemplary embodiment, the at least one groove 110 may be formed on the outer circumferential surface of the shaft 100 in a straight line. As described above, the gas flows along the outer circumferential surface of the shaft 100 from the front to the rear the shaft 100. If the shaft 100 rotates clockwise, the moving path of the gas on the outer circumferential surface of the shaft 100 draws a counterclockwise curved line. Therefore, the straight groove 110 formed on the outer circumferential surface of the shaft 100 can reduce the flow resistance of the gas if it has a shape similar to the movement path of the gas. Specifically, the at least one groove 110 formed in a straight line on the outer circumferential surface of the shaft 100 may have a shape that is inclined in the direction opposite to the rotation direction of the shaft 100 from a line parallel to the central axis of the shaft 100, thereby reducing the flow resistance of the gas.

The at least one groove 110 may be formed in a variety of shapes other than above-described shapes as long as the flow resistance of the cooing gas moving along the groove 110 can be reduced. It is, however, to be noted that the at least one groove 110 should be formed in a shape that the pressure field of the gas film formed between the top foil 230 and the shaft 100 is not intermitted. Particularly, if the groove 110 is formed in a straight line parallel to the axial direction of the shaft 100, intermittence of the pressure field may be caused.

The shaft 100 rotates at a high speed and transmits a radial force to the foil radial bearing 200. When the shaft 100 moves in the radial direction, the greatest pressure is applied to a portion where the bearing comes closest to the shaft 100 (hereinafter referred to as the pressed portion), which has a rectangular shape having a narrow width or a straight line shape along the axial direction of the shaft 100 on the inner circumferential surface of the bearing depending on the pressure applied from the shaft 100 to the inner circumferential surface of the bearing. If the groove 110 is formed on the outer circumferential surface of the shaft 100 in a straight line parallel to the axial direction of the shaft 100, the pressed portion in a straight line shape may completely overlap with the position of the groove 110. The thickness of the gas film formed between the top foil 230 of the foil radial bearing 200 and the shaft 100 increases in the groove 110, such that the pressure is partially reduced. If the position of the pressed portion partially overlaps with the groove 110, the loss of the average surface pressure of the gas film is negligible, and thus the support effect of the bearing is not greatly affected. However, if the position of the pressed portion completely overlaps with the position of the groove 110, the pressure field for supporting the shaft 100 may be intermitted. When this happens, the bearing fails to support the radial force of the shaft 100, such that the rotator cannot be driven stably. For this reason, according to the exemplary embodiment, the at least one groove 110 is formed on the outer circumferential surface of the shaft 100 in the form of a curved line, an inclined straight line, or the like in order to prevent the pressure field supporting the shaft 100 from being intermitted.

A single groove or a plurality of grooves may be formed on the outer circumferential surface of the shaft 100. A single groove 110 may be formed spirally around the outer circumferential surface of the shaft 100, or a plurality of grooves 110 may be spaced apart from one another at a regular distance along the circumferential direction of the shaft 100. The groove 110 is formed on a part of the outer circumferential surface of the shaft 100 overlapping with the top foil 230 of the radial bearing. In doing so, the groove 110 may be formed in such a shape that allows for the paths of cooling gas to be evenly distributed in the portion where the bearing is disposed, and that increases the contact area between the shaft 100 and the cooling gas.

Referring back to FIGS. 3 and 4, according to the exemplary embodiment, the cross-section of each of the grooves 110 formed in the shaft 100 may have a semicircular shape. However, the cross-section of the grooves 110 is not limited to the semicircular shape. For example, the cross-section of the grooves 110 may be formed in a triangle shape, a quadrangle shape or the like, as long as it does not cause deformation due to the stress generated when the shaft 100 rotates.

Hereinafter, openings formed in the groove 110 for facilitating inflow/outflow of the cooling gas will be described.

Figure 7:
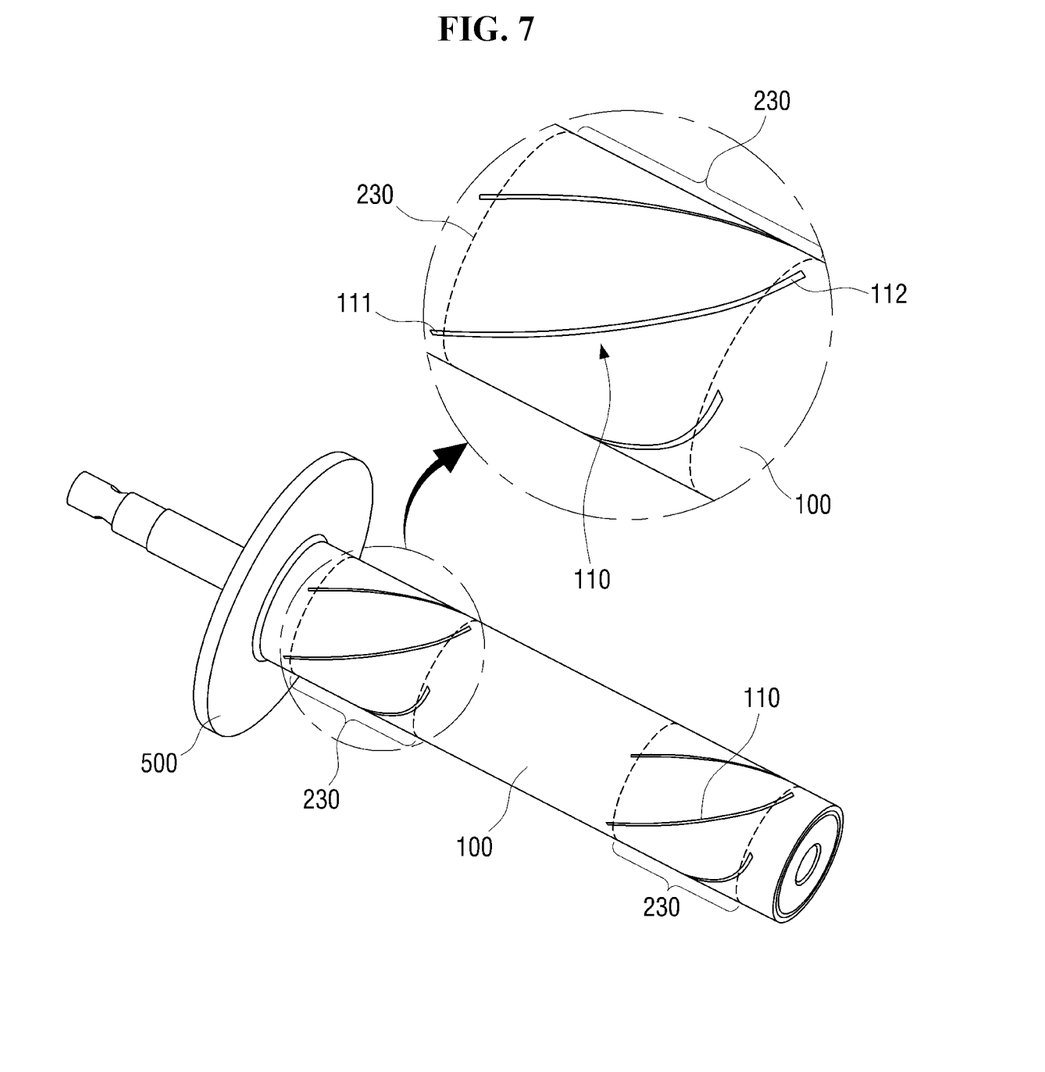
FIG. 7 is a perspective view of a radial load support apparatus according to an exemplary embodiment when viewed from the rear.

FIG. 7 is a perspective view of a radial force support apparatus according to an exemplary embodiment when viewed from the rear.

Referring to FIG. 7, openings 111 and 112 (or end portions 111 and 112 of the groove) which do not overlap with the top foil 230 may be formed at both ends of the groove 110 formed on the outer circumferential surface of the shaft 100, respectively. The surface of the groove 110 that faces the foil radial bearing 200 is open. As the shaft 100 moves to a position very close to the top foil 230 of the foil radial bearing 200 while rotating at high speed, the shaft 100 may compress (or push against) the top foil 230. A thin, high-pressure gas film is formed between the shaft 100 and the top foil 230 of the foil radial bearing 200 to support the load of the shaft 100, and thus the shaft 100 is not in physical contact with the top foil 230. However, it is difficult for the cooling gas to flow in/out through the groove 100 of the shaft 100 at the portion where the top foil 230 overlaps with the shaft 100. If the inflow and outflow of the cooling gas are not efficiently performed, the cooling gas cannot flow continuously, which would result in a decrease in the cooling efficiency.

In order to solve such a problem, the top foil 230 of the foil radial bearing 200 according to an exemplary embodiment may be disposed between both ends 111 and 112 of the groove 110. Accordingly, both ends of the groove 110 may form openings 111 and 112, respectively, which do not overlap with the top foil 230 to serve as an inlet and an outlet of the cooling gas, respectively. When the gas flows along the outer circumferential surface of the shaft 100, the front opening 111 of one groove 110 may work as the inlet for the cooling gas, and the rear opening 112 thereof may work as the outlet for the cooling gas.

As described above, by forming the openings 111 and 112 at both ends of the groove 110, respectively, the continuous flow of the cooling gas can be facilitated, so that a larger volume of air can continuously flow out to the rear face of the impeller 400. Although this improves the cooling effect of the rotator, it results in a decrease in the compression efficiency of the turbo apparatus. Therefore, in order to find a trade-off between the improvement of the cooling effect and the loss of the compression efficiency, the size of the groove 110, the size of the openings, and the like should be appropriately designed taking into account the rotational speed of the shaft 100 and the temperature of the generated heat.

In the radial force support apparatus according to above-described exemplary embodiment of the present disclosure, the groove 110 for facilitating the inflow/outflow of the cooling gas is formed on the shaft 100, so that it is possible to prevent the rotor from overheating even without any additional cooling device.

While exemplary embodiments have been described above, it will be understood by those of ordinary skill in the art that various changes in form and details may be made therein without departing from the spirit and scope of the disclosure as defined by the following claims.

What is claimed is:

1. A radial force support apparatus comprising:
    a shaft coupled to an impeller and configured to rotate together with the impeller; and
    a foil radial bearing supporting the shaft,
    wherein the foil radial bearing comprises a top foil disposed on an inner circumferential surface of the foil radial bearing and facing at least a part of an outer circumferential surface of the shaft,
    wherein the shaft facing the top foil comprises at least one groove provided on the outer circumferential surface of the shaft,
    wherein opposite ends of each of the at least one groove do not overlap with the top foil, and
    wherein the at least one groove is formed in a curved line with respect to an axial direction of the shaft.

2. The apparatus of claim 1, wherein the at least one groove formed in the curved line has a shape that spirals on the outer circumferential surface of the shaft in a direction opposite to a rotation direction of the shaft.

3. The apparatus of claim 1, wherein a cross-section of the at least one groove has a semicircular shape, a quadrangular shape or a triangular shape.

4. A radial force support apparatus comprising:
    a shaft coupled to an impeller and configured to rotate together with the impeller; and
    a foil radial bearing supporting the shaft and comprising a top foil disposed on an inner circumferential surface of the foil radial bearing and facing an outer circumferential surface of the shaft,
    wherein the shaft comprises a plurality of grooves provided on the outer circumferential surface of the shaft, each of the plurality of grooves extending in a direction opposite to a rotation direction of the shaft,
    wherein opposite ends of each of the plurality of grooves do not overlap with the top foil, and
    wherein each of the plurality of grooves is formed in a curved line with respect to an axial direction of the shaft.

* * * * *